(12) United States Patent
Liu et al.

(10) Patent No.: US 7,717,462 B2
(45) Date of Patent: May 18, 2010

(54) TILT STEERING MECHANISM

(75) Inventors: Xue Mei Liu, Vancouver (CA); Art Ferguson, Glenview, IL (US); Eric B. Fetchko, Burnaby (CA); Neal Wesley Denis Wood, Coquitlam (CA)

(73) Assignee: Teleflex Canada Incorporated, Richmond, British Columbia (CA)

( * ) Notice: Subject to any disclaimer, the term of this patent is extended or adjusted under 35 U.S.C. 154(b) by 838 days.

(21) Appl. No.: 11/444,534

(22) Filed: Jun. 1, 2006

(65) Prior Publication Data

US 2007/0278777 A1   Dec. 6, 2007

(51) Int. Cl.
 *B62D 1/18* (2006.01)
 *F16C 33/36* (2006.01)

(52) U.S. Cl. .................. 280/775; 280/779; 384/571; 384/538

(58) Field of Classification Search ................. 384/517, 384/518, 537–539, 535, 584, 585, 563, 495, 384/558, 571, 620; 280/775, 779
See application file for complete search history.

(56) References Cited

U.S. PATENT DOCUMENTS

| 2,509,587 | A | | 5/1950 | Creson |
| 4,850,239 | A | | 7/1989 | Oosterwal |
| 4,941,766 | A | | 7/1990 | Carlson |
| 5,222,817 | A | * | 6/1993 | Glazier .................. 384/559 |
| 5,538,282 | A | * | 7/1996 | White et al. ............. 280/779 |
| 5,826,987 | A | * | 10/1998 | Beaman .................. 384/517 |
| 5,829,891 | A | * | 11/1998 | Beaman .................. 384/495 |
| 5,975,766 | A | * | 11/1999 | Cau ....................... 384/538 |
| 6,179,473 | B1 | * | 1/2001 | Ponson et al. ............ 384/537 |
| 6,227,715 | B1 | | 5/2001 | Erhardt |
| 6,375,360 | B1 | * | 4/2002 | Weisskopf et al. ........ 384/538 |
| 6,416,229 | B1 | * | 7/2002 | Wolf ..................... 384/516 |
| 7,302,979 | B2 | * | 12/2007 | Davison et al. ........... 152/417 |
| 2003/0079563 | A1 | * | 5/2003 | Rouleau et al. ............ 74/493 |
| 2006/0207705 | A1 | * | 9/2006 | Davison et al. ........... 152/415 |

FOREIGN PATENT DOCUMENTS

| EP | 0893326 A2 | 1/1999 |
| FR | 2756885 A1 | 6/1998 |
| FR | 2760496 A1 | 9/1998 |

* cited by examiner

*Primary Examiner*—Paul N Dickson
*Assistant Examiner*—Drew Brown
(74) *Attorney, Agent, or Firm*—Baker & Hostetler LLP (57) ABSTRACT

The invention relates to a steering apparatus for a vehicle. It includes a housing with a steering shaft having a longitudinal axis. A first bearing is interposed between the shaft and the housing, permitting rotation of the steering shaft about the axis. There is also a first wedge-shaped member that has a thin end against the first bearing and a means for biasing the first wedge-shaped member against the first bearing to take up play between the shaft and first bearing, and play within the first bearing.

18 Claims, 12 Drawing Sheets

TILT STEERING MECHANISM

BACKGROUND OF THE INVENTION

Traditionally, marine tilt steering mechanisms have used a bushing style bearing to support the steering shaft in shaft housings. As an example of this arrangement, see U.S. Pat. No. 4,941,766 to Carlson. While bushings may be sufficient for some applications, they may not be ideal in a marine steering context. This is because boats do not have a long steering column as would be found in a tractor or car. A longer steering column allows the contact points of the bushing bearing to be spaced apart a significant distance. Because the contact points can be spaced further apart compared to a marine system, there can be some radial clearance in the bearings without having noticeable movement (play) in the steering wheel.

Functionally, bushings require some clearance or they will not allow motion between the turning and stationary components. There will always be some wear in a bushing which further increase clearances. Because in a boat the entire tilting action must take place in front of the dash without moving the steering wheel too close to the driver, the steering shaft support area is very short—generally around one inch. Given the clearances that exist and the short distance between the support points relative to the distance to the outside of the steering wheel, these clearances may result in undesirable movement at the outer edges of the steering wheel.

SUMMARY OF THE INVENTION

One of the inventors' solutions to this problem involves the use a preloaded angular contact needle bearing. The preload reduces any clearance in the radial or axial directions under reasonable loads. Play is further reduced through the use of a wedge-shaped member which engages the bearing when under load. This acts to significantly take up play between the bearing and the shaft, and play within the bearing.

One aspect of the invention involves a steering apparatus for a vehicle. It comprises a housing with a steering shaft having a longitudinal axis. A first bearing is interposed between the shaft and the housing, permitting rotation of the steering shaft about the axis. There is also a first wedge-shaped member that has a thin end against the first bearing and a means for biasing the first wedge-shaped member against the first bearing to take up play between the first bearing and shaft, and play within the first bearing.

According to another aspect, the invention involves a steering apparatus for a vehicle comprising a support member having a cavity therein and a steering shaft received within the cavity. The steering shaft has a longitudinal axis. A bearing is interposed between the shaft and the support member, permitting rotation of the steering shaft about the axis. There is also a play reducing member having a surface tightly engaging the bearing. The surface is inclined with respect to the axis.

Alternatively, the invention can be described as involving a steering apparatus for a marine craft comprising a support member having a cavity therein, and a steering shaft received within the cavity. The steering shaft has a longitudinal axis. A pair of bearings are interposed between the shaft and the member, permitting rotation of the steering shaft about the axis. There is also a play reducing member having a surface tightly engaging each said bearing. The surface is inclined with respect to the axis.

BRIEF DESCRIPTION OF THE DRAWINGS

Referring to the drawings.

DETAILED DESCRIPTIONS OF THE PREFERRED EMBODIMENTS

Figure 1:
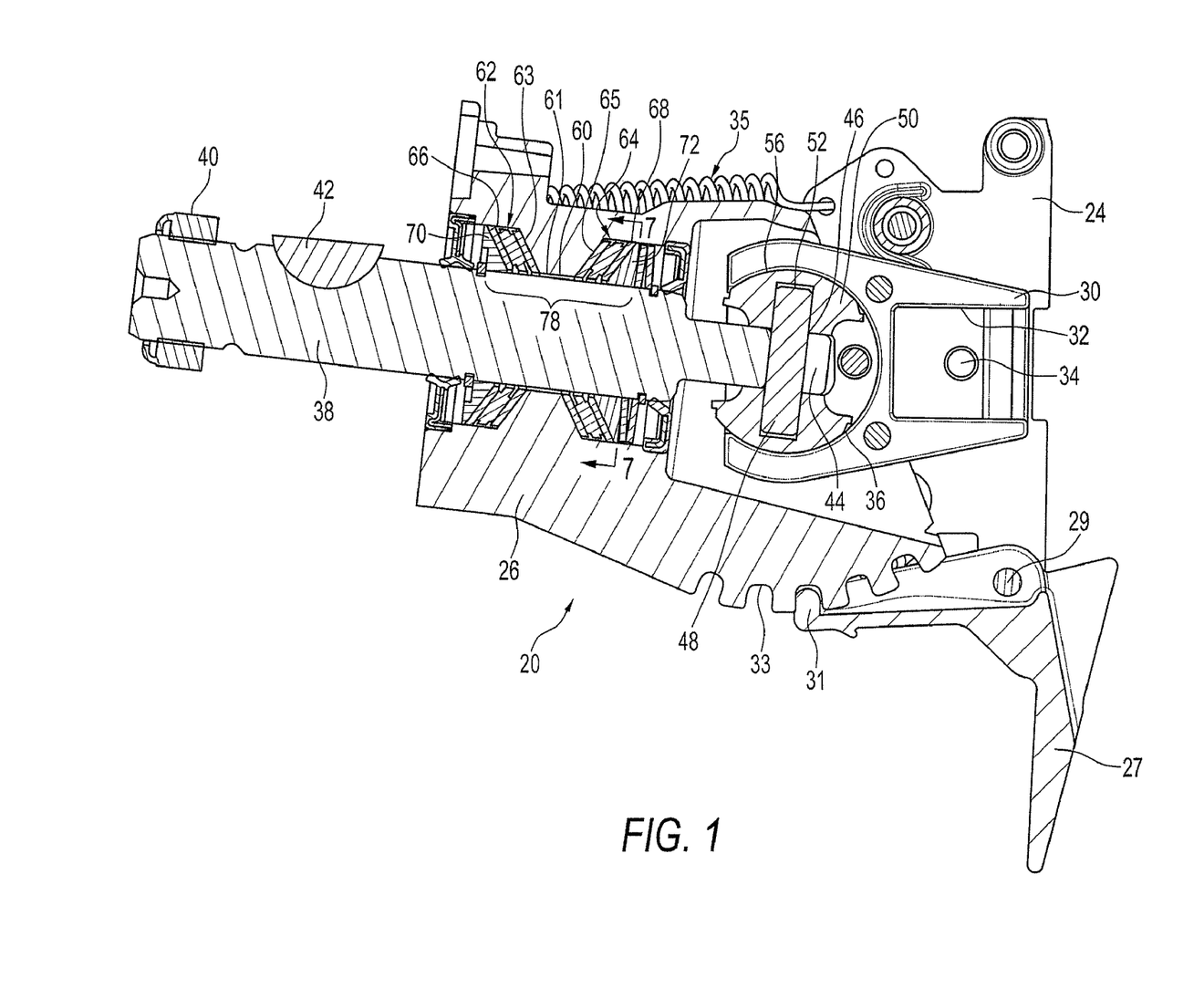
FIG. 1 is a sectional view of a tilt steering mechanism according to an embodiment of the invention.

Referring to the drawings and first to FIG. 1, a tilt steering mechanism is shown generally at 20. The mechanism is suitable for use with boats or other vehicles such as automobiles. The mechanism includes a housing 26, capable of vertical tilting as described below, and a bracket 24, which is stationary and typically mounted to the dashboard of the vehicle. The steering mechanism is generally similar to that disclosed in U.S. Pat. No. 4,941,766 to Carlson, which is incorporated herein by reference.

It will be appreciated by those skilled in the art that the apparatus could connect to helm pumps, electrical devices, or other such steering devices in a variety of ways. Connection means for the tilt steering mechanism include the use of a potentiometer for detecting changes in motion of a steering shaft or the use of electrical sensors for detecting changes in motion of a steering shaft. Additionally, another style of U-joint could be used other than the one presented below.

In this example, the apparatus includes a socket member 30 having a rectangular recess 32 at one end for receiving a main portion of a steering shaft (not shown) which is connected to the steering gear of the vehicle. As stated above, this could be a helm pump for a marine hydraulic steering system. A pin is received in aperture 34 such that the main portion of the steering shaft rotates with the socket member 30. The socket member includes a socket 36 which is partially circular when viewed from the side as shown in FIG. 1. The apparatus includes a stub shaft or tiltable portion 38 of the steering shaft to which a steering wheel (not shown) is connected by nut 40 and key 42. The stub shaft has an inner end 44 with an aperture 46 receiving a pin 48. A pair of cap members 50 is received within the socket 36. Each has a cylindrical socket 52 receiving one end of the pin 48. Each of the cap members 50 has a convexly curved outer side 56 rotatably received within the socket 36 of the socket member 30.

Each of the cap members has opposing flat faces (not shown) extending from the outer side 56 towards the other cap member. These faces are vertical in the position shown in FIG. 1. These flat faces engage corresponding flat faces within the socket 36 of the socket member 30. Accordingly it may be seen that the stub shaft 38 can tilt vertically, but side to side motion is prevented.

The housing 26 can be tilted to a desired position by manually pivoting lever 27 about pin 29 and thereby disengaging tooth 31 from one of the plurality of slots 33 and releasing the pivoting lever 27 when the housing 26, and accordingly the steering wheel, are at the desired angle and vertical position. A coil spring 35 is stretched between the housing 26 and the bracket 24, thus biasing the housing 26 and the steering wheel to a raised position.

The housing 26 has a cavity 60 which rotatably receives stub shaft 38. The housing 26 acts as a support member for the stub shaft 38. In a more conventional unit of this type, such as disclosed in U.S. Pat. No. 4,941,766, the stub shaft is rotatably supported in the housing by a simple bushing. For many applications this is sufficient. However a relatively small amount of play between the bushing, the housing and the shaft results in an exaggerated amount of play at the rim of the steering wheel connected to the shaft. The amount of play in the bearing is exaggerated by the diameter of the steering wheel. This amount of play may be unacceptable or undesirable for some applications, particularly for high-quality steering systems.

In this embodiment, a pair of bearings 62 and 64, angled or tapered needle bearings in this example, are received within enlarged portions 66 and 68 of the cavity 60. The housing 26 includes angled interior surfaces 63 and 65 as shown in FIG. 1 extending towards the shaft 38 and which are adjacent to the enlarged portions 66 and 68, respectively. The pair of bearings 62 and 64 abut with the housing at the angled interior surfaces 63 and 65, respectively. These bearings rotatably support the stub shaft within the housing 26. Such bearings are advantageous because they provide axial support for the stub portion of the steering shaft as well as radial support, that is support perpendicular to the shaft, within the housing 26. However, undesirable play may still occur between the shaft and the bearings and within the bearings.

Figure 5A:
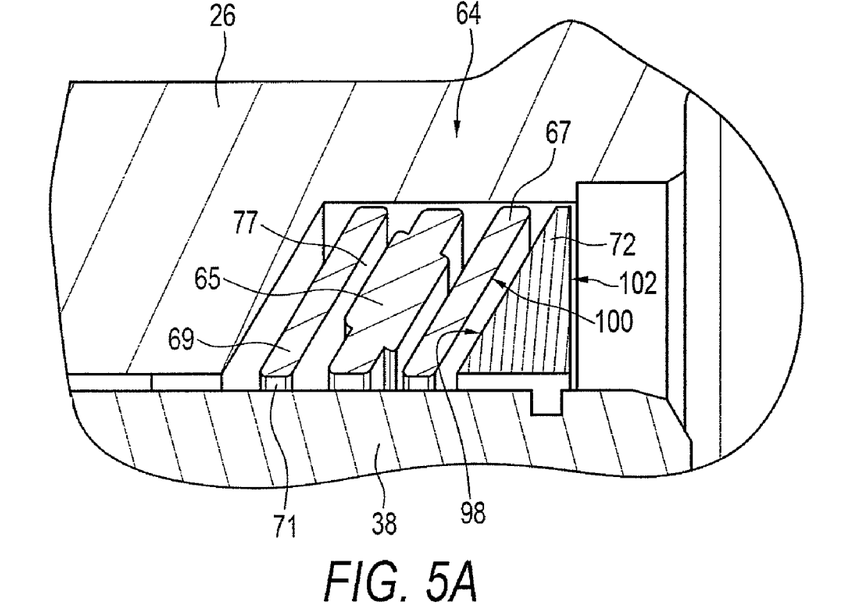
FIGS. 5A and 5B are enlarged, fragmentary sectional views showing in greater detail a fragment of a typical bearing and the associated play that is possible between adjacent elements, FIG. 5A showing play prior to reduction thereof and FIG. 5B after reduction according to the invention.
Figure 5B:
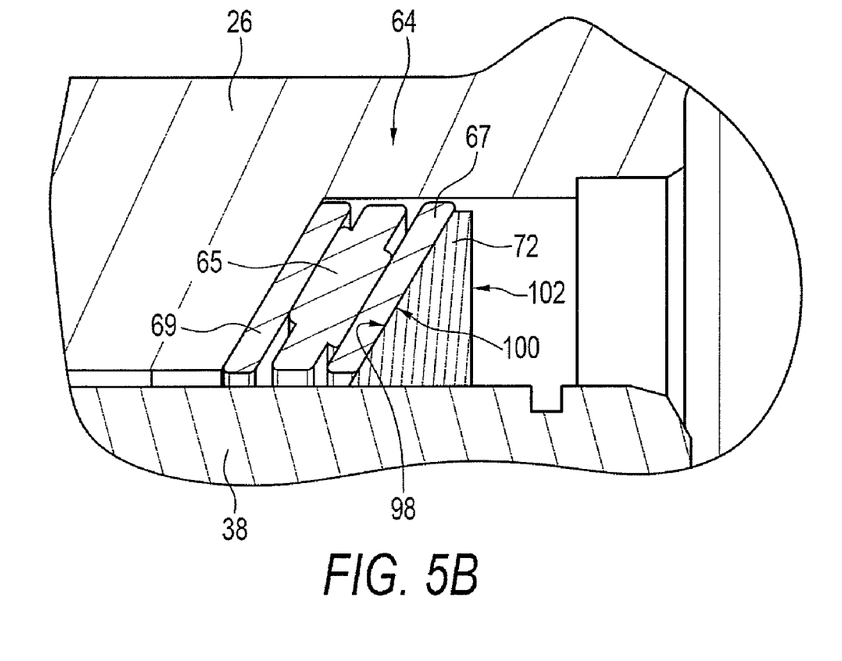

As shown in FIG. 5A, the bearing 64 has a plurality of circumferentially space-apart rollers 65 rotatably received between a first race 67 of the bearing and a second race 69. Play is possible between a number of adjacent elements as shown diagrammatically in FIG. 5A by play 71 between the bearing 64 and the stub shaft 38, and play 77 between the roller and the races 67 and 69 of the bearing. As shown in FIG. 5B, the play reducing member 72 effectively takes up space and effectively sandwiches the bearing 64 between the play reducing member 72 and housing 26. Similarly, the play reducing member 72 is sandwiched between the bearing 64 and the stub shaft 38.

Figure 2:
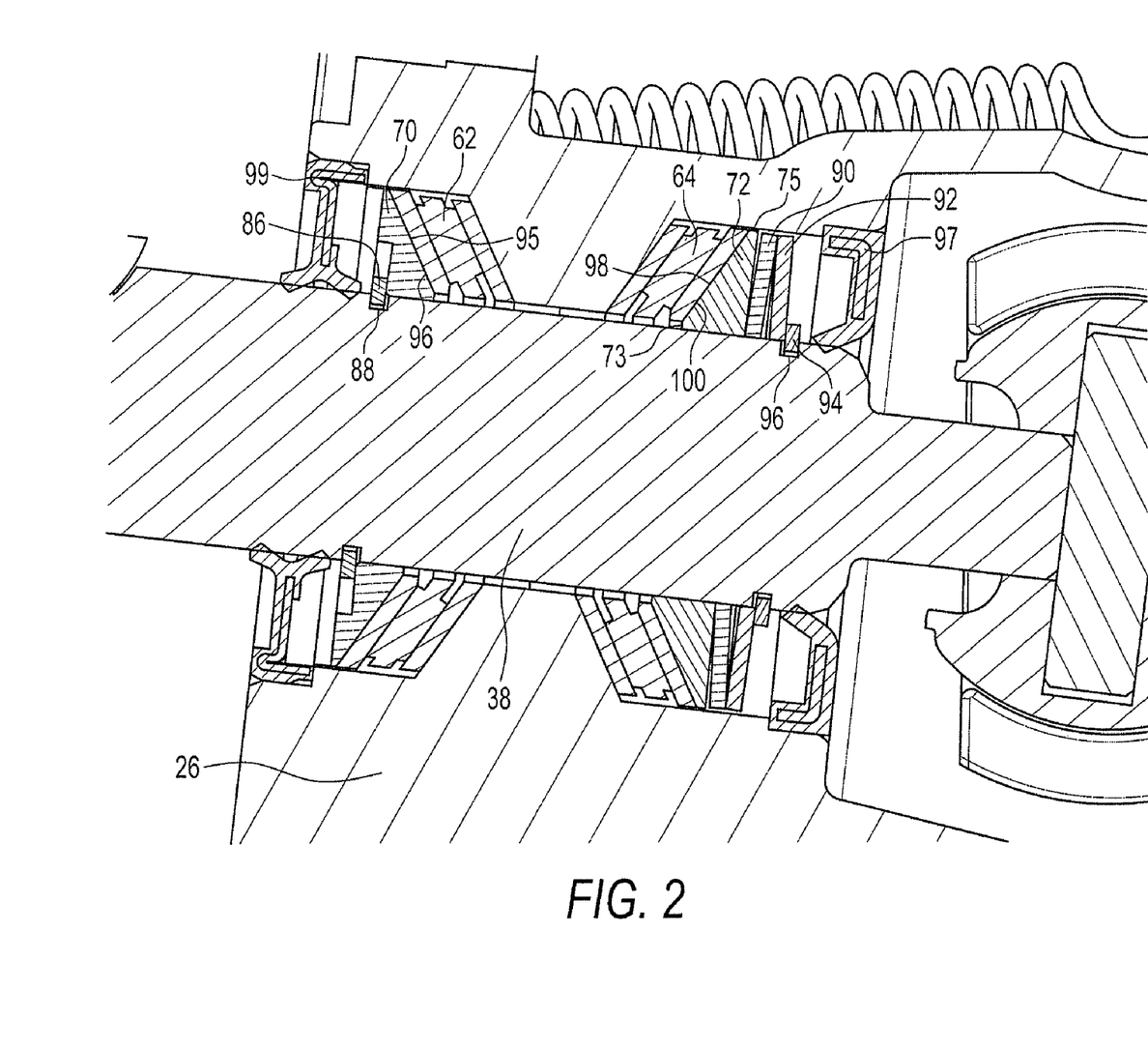
FIG. 2 is an enlarged sectional view thereof showing in greater detail the area of the steering shaft being supported within a housing, with the bearings being tapered needle bearings supported by play reducing members.
Figure 7:
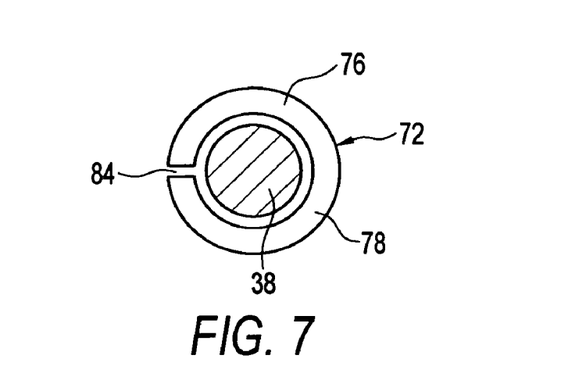
FIG. 7 is a sectional view, taken along line 7-7 of FIG. 1, showing the steering shaft and the play reducing member.

The embodiment of FIG. 1 has a pair of play reducing members, in this case annular wedge-shaped members 70 and 72, extending about the stub shaft 38 and defining a shaft support area 78 as shown. FIG. 2 more clearly shows these play reducing members 70 and 72. Play reducing member 72 can also be referred to a first wedge-shaped member or a first play reducing member. Play reducing member 70 can also be referred to as a second wedge-shaped member or a second play reducing member. FIG. 7 illustrates that play reducing member 72 is a split ring separated by a split 84 extending radially with respect to the stub shaft 38.

Referring to FIG. 2, play reducing member 70 is fixed along stub shaft 38 by a snap ring 86 received in annular groove 88 on the shaft so as to prevent movement of the play reducing member away from the bearing 62. The snap ring 86 can be referred to as a first stop. Play reducing member 72 has its thin end or first end 73 biased towards the bearing 64 by a spring comprising a pair of spring washers 90 and 92 which extend about the shaft. The spring washers 90 and 92 are resilient, and can be referred to as a first resilient member. The spring washers 90 and 92 are compressed together between the play reducing member 72 and a snap ring 94 received in annular groove 96 on the shaft 38, thus biasing play reducing member 72 towards the bearing 64. The snap ring 94 can be referred to as a second stop. In this example, the spring washers 90 and 92 have their concave sides facing each other, but someone skilled in the art will appreciate that the spring washers 90 and 92 could equally have their concave sides on opposite sides of each other. The play reducing member 72 has a second end 75 and is inclined towards the shaft from the second end towards the first end 73. There are seals 97 and 99 extending about the stub portion 38 of the steering shaft and the housing 26 on each side of the assembly just described including the bearings, the play reducing members and the snap rings.

Play reducing member 70 has an inclined surface 95 which opposes inclined surface 96 of bearing 62. Likewise play reducing member 72 has an inclined surface 98 which opposes inclined surface 100 of bearing 64. The surfaces have first and second ends corresponding to the first and second ends of the play reducing member.

When the play reducing member 72 is forced to the left, from the point of view of FIGS. 5A and 5B, towards bearing 64, the play reducing member 72 collapses around the stub shaft 38 as the split 84 of the play reducing member 72, shown in FIG. 7, is reduced in size, and also mates with and tightly engages the bearing 64. This takes up the play between the various components shown FIG. 5A since the bearing 64 is forced away from the shaft 38, towards housing 26 and the two races of the bearing, first race 67 and second race 69, are forced together with the spaced-apart rollers 65 in between. This reduces or eliminates perceptible play at the rim of the steering wheel.

Figure 3:
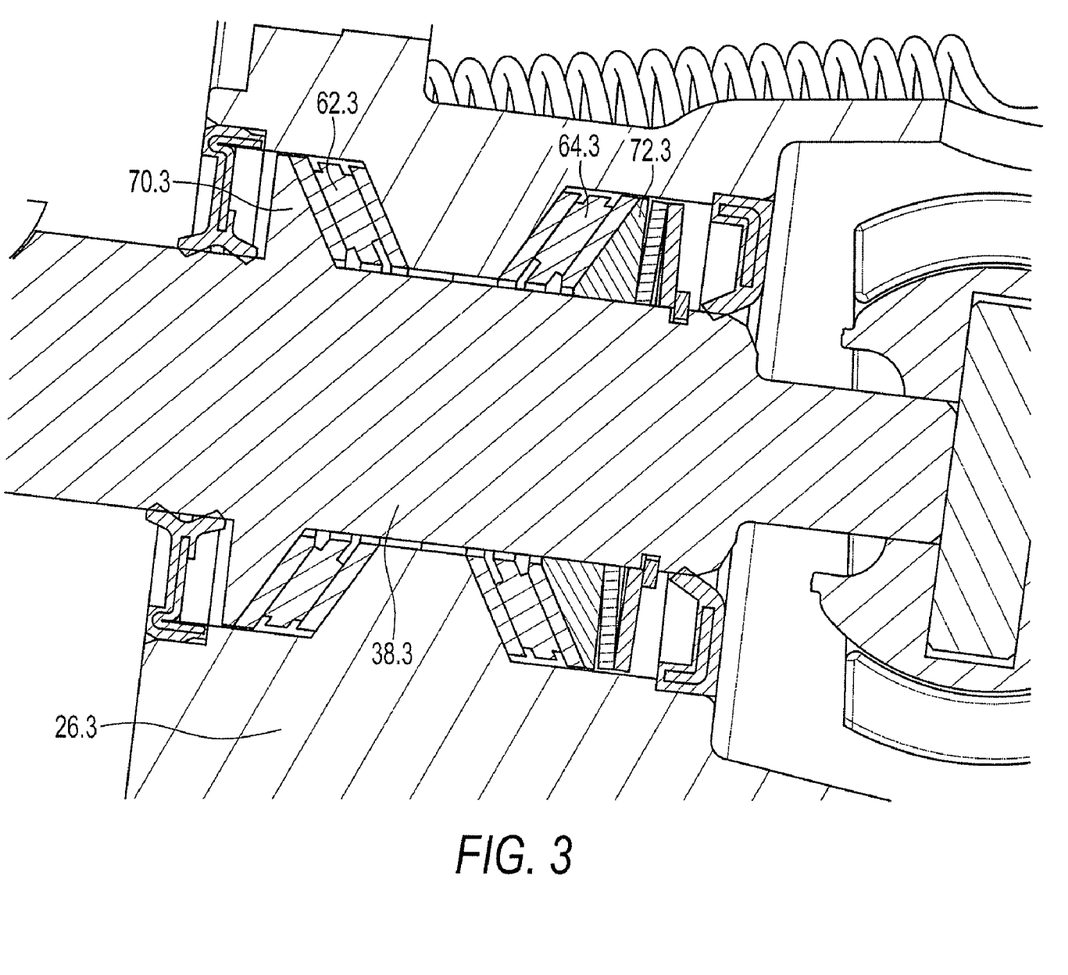
FIG. 3 is a view similar to FIG. 2 of a variation where one of the play reducing members is formed integrally with the stub shaft.

A number of variations of the invention are possible. Referring to FIG. 3, this shows a variation generally similar to the previous embodiment and like parts have like numbers with the additional designation ".3". In this example the play reducing member 70.3 is formed integrally with stub shaft 38.3.

Figure 4:
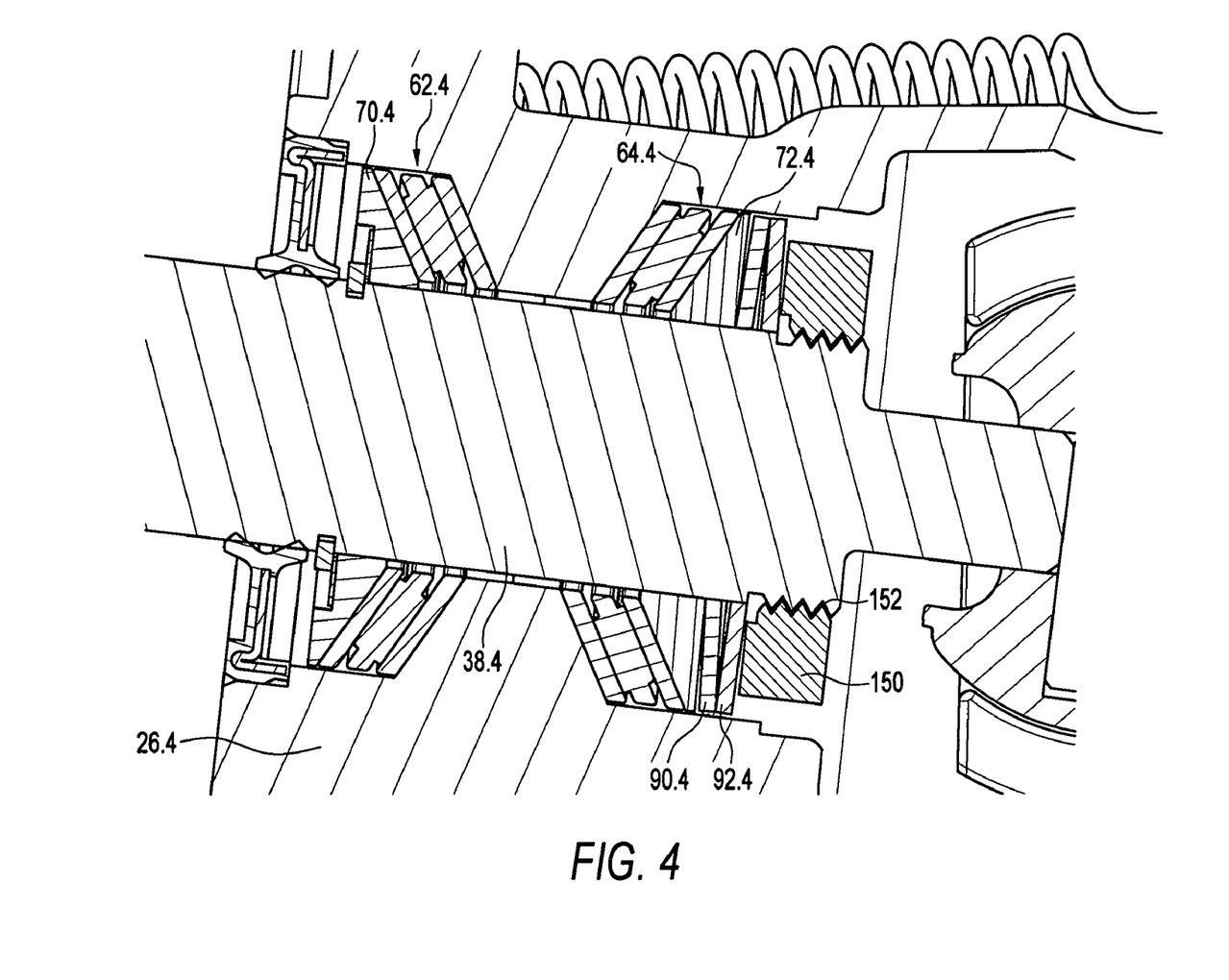
FIG. 4 is a view similar to FIG. 2 of an alternative embodiment of the invention using a nut threadedly engaging a threaded portion of the stub shaft and pressing spring washers towards the bearings.

Referring to FIG. 4, like parts have like numbers with the additional designation ".4". In this example, instead of snap ring 94, there is a nut 150 threadedly engaging a threaded portion 152 of stub shaft 38.4 to press the spring washers 90.4 and 92.4 towards the bearing 64.4. The nut 150 acts as a form of macro adjustment to ensure that the spring washers 90.4 and 92.4 can act as a springs within their limited displacement range and perform a micro-adjustment function. Less demanding machining requirements are needed compared to previous embodiments, as the nut 150 acts to compensate for any such variations.

In an alternative embodiment not shown, the nut 150 could act alone to press the play reducing member 72.4 towards the bearing 64.4. Fine adjustments of the nut 150 could eliminate the need for spring washers 90.4 and 92.4.

Figure 6:
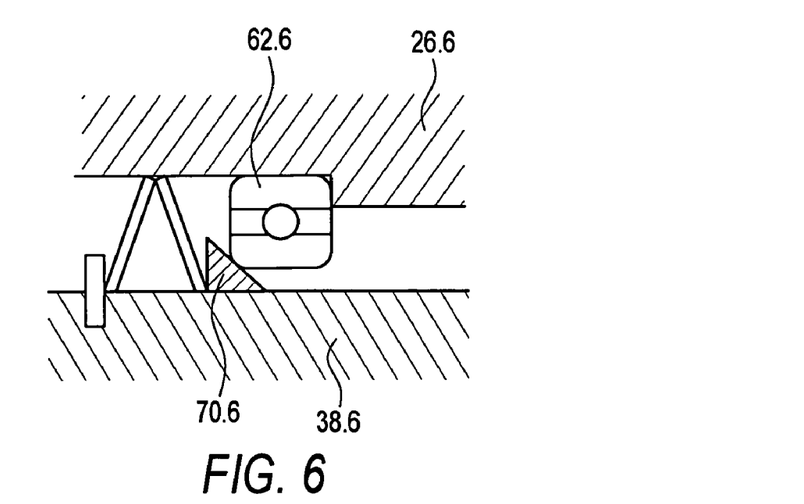
FIG. 6 is an enlarged, fragmentary sectional view of an alternative embodiment where the bearing is a ball bearing.

FIG. 6 shows a variation where like parts have like numbers with the additional designation ".6". In this example the bearing 62.6 is a ball bearing instead of a tapered needle bearing, and the play reducing member 70.6 presses against ball bearing 62.6.

Figure 8:
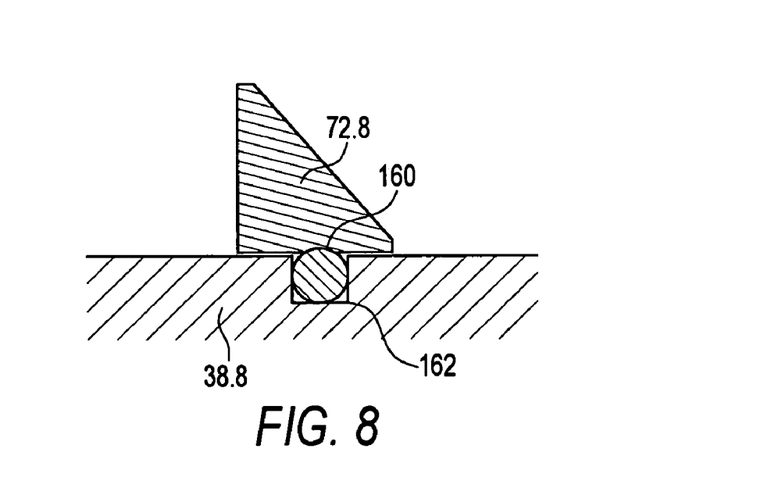
FIG. 8 is an enlarged fragmentary view of an alternative embodiment of the invention which shows an o-ring in an annular groove of the stub shaft and between the stub shaft and the play reducing member.

In the embodiment of FIG. 8, where like parts have like numbers with the additional designation ".8", there is an o-ring 160 in an annular groove 162 of the stub shaft 38.8 and between the stub shaft 38.8 and the play reducing member 72.8. The play reducing members as exemplified by play reducing member 72.8, are whole—not containing a split. Play reducing member 72.8 presses up snugly against the tapered needle bearing (not shown) and the stub shaft 38.8 over o-ring 160. This embodiment removes the need for the play reducing members to be split. This is because o-ring 160 is compressed, and the associated reactive force thereby holds the play reducing member 72.8 centered on the stub shaft 38.8. This embodiment provides a more even force which keeps the play reducing member 72.8 and stub shaft 38.8 connected to each other.

Figure 9:
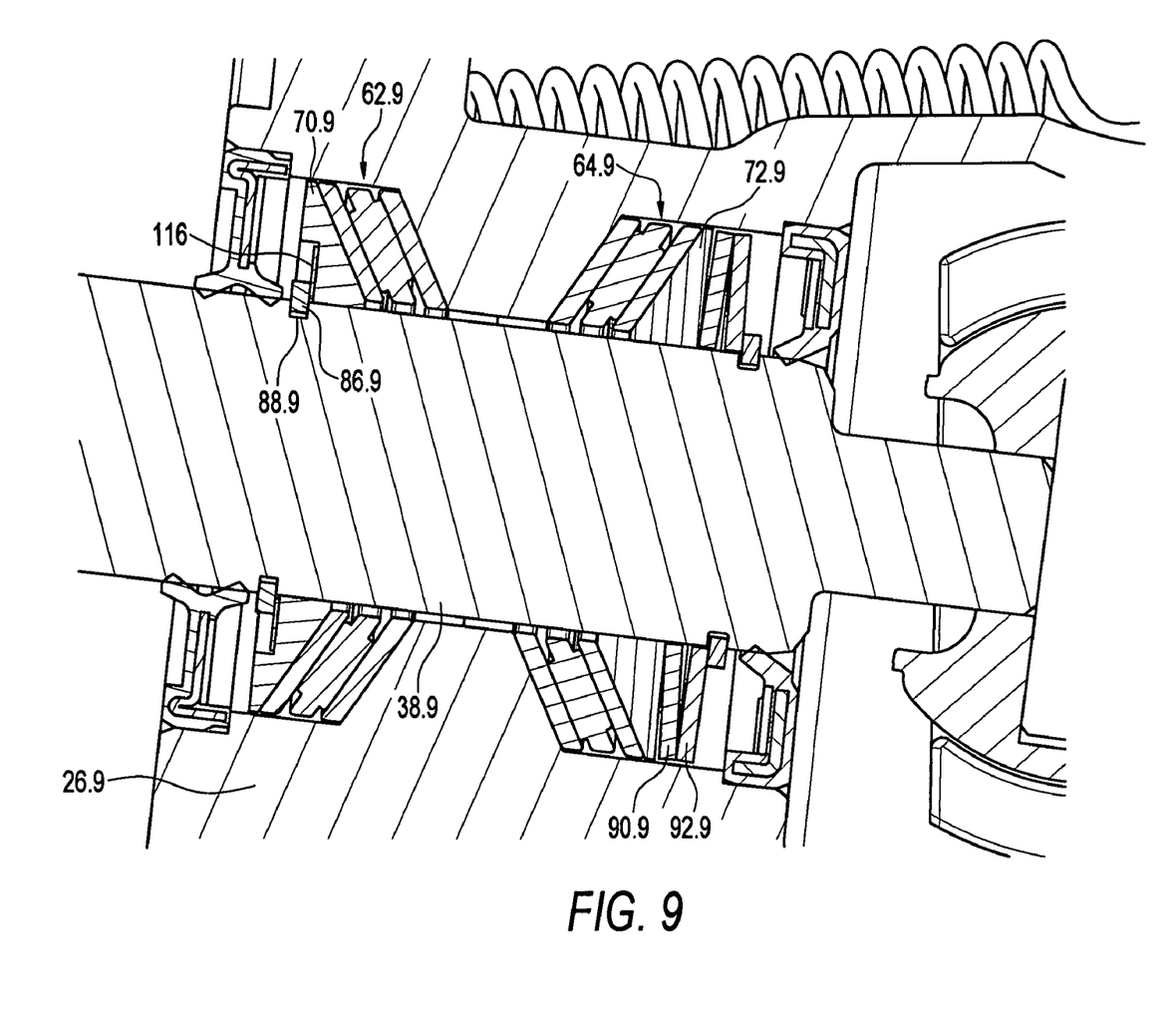
FIG. 9 is a view similar to FIG. 2 of an alternative embodiment of the invention using an outer shim which extends around the stub shaft and press the play reducing member towards the bearing.

FIG. 9 shows a variation where like parts have like numbers with the additional designation ".9". In this example, an outer, annular shim 116 extending about the stub shaft 38.9 act to press the play reducing member 70.9 towards the bearing 62.9. The outer shim 116 act as a form of macro adjustment to ensure that the spring washers 90.9 and 92.9 can act as a springs within their limited displacement range and perform a micro-adjustment function. Less demanding machining requirements are needed, as the outer shim 116 act to compensate for any such variations. It will be appreciated by those skilled in the art that one or more shims can be used.

Figure 10A:
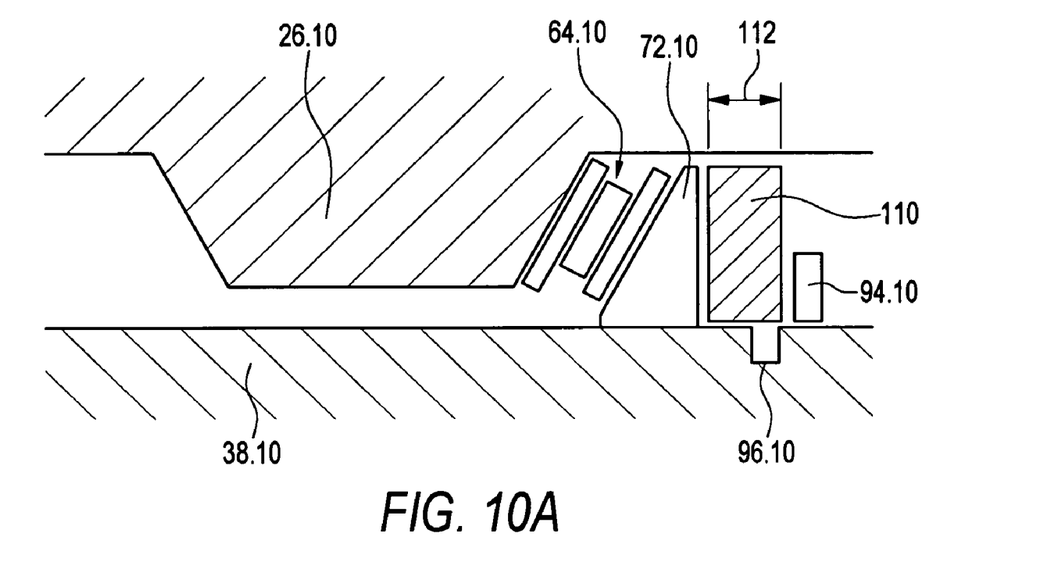
FIGS. 10A and 10B are enlarged fragmentary views of an alternative embodiment of the invention which shows a crushable member which fits between the play reducing member and a snap ring, and presses the play reducing member towards the bearing, FIG. 10A showing the crushable member prior to crushing and FIG. 10B after crushing.
Figure 10B:
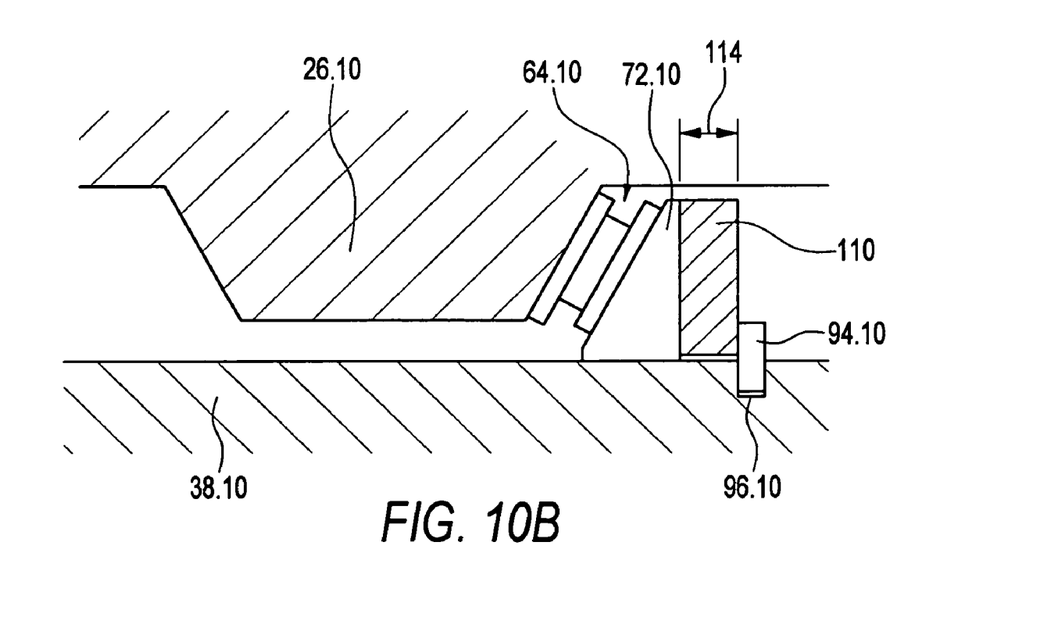

FIGS. 10A and 10B show a variation where like parts have like numbers with the additional designation ".10". In this example, a crushable member 110 extends about the stub shaft 38.10 to press the play reducing member 72.10 towards the bearing 64.10. The crushable member 110 could consist of such things as a porous material, a corrugated material (not shown) or a washer with protrusions which yield upon compression (not shown). In this example, the crushable member 110 acts to replace the need for spring washers. The crushable member yields to a certain pre-defined force. The crushable member has an uncrushed width 112 and an crushed width 114. During assembly, the crushable member is crushed to a desired crush width 114. The crushed width corresponds to the distance between play reducing member 72.10 and snap ring 94.10 when in its annular groove 96.10. In its crushed state, the crushable member 110 acts to press the play reducing member 72.10 towards the bearing 64.10.

Alternatively, the crushable member 110 can act as a form of macro adjustment in association with spring washers to ensure that the spring washers (not shown) can continue to act as a springs within their limited displacement range and perform a micro-adjustment function. This embodiment requires less demanding machining requirements, as the crushable member 110 acts to compensate for any such variations.

Figure 11:
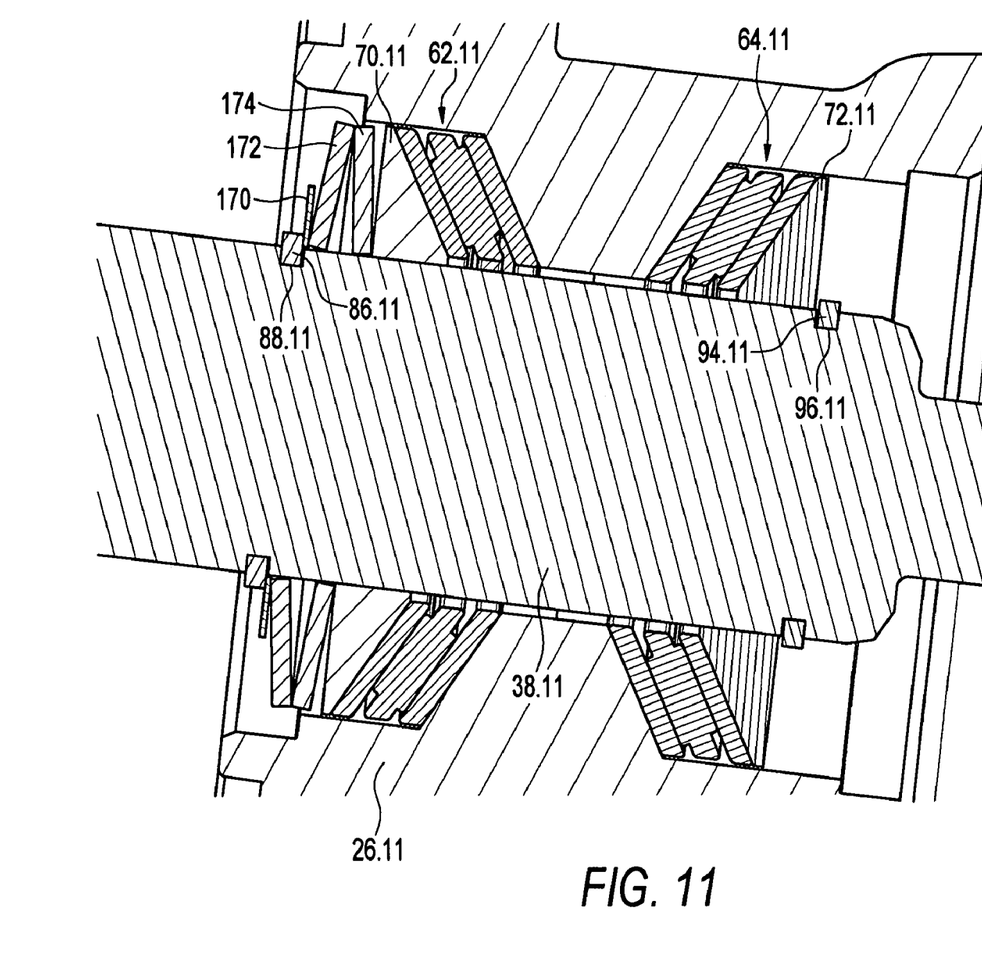
FIG. 11 is an enlarged sectional view of an alternative embodiment of the invention where spring washers are located between the second play reducing member and the outer shim, pressing the second play reducing member towards the bearing.

FIG. 11 shows a variation where like parts have like numbers with the additional designation ".11". In this example, spring washers 172 and 174 are located between the second play reducing member 70.11 and outer shim 170. As was similarly mentioned above in an alternative embodiment, the outer shim 170 acts as a form of macro adjustment to ensure that the spring washers 172 and 174 can act as a springs within their limited displacement range and perform a micro-adjustment function. Less demanding machining requirements are needed, as the outer shim 170 acts to compensate for any such variations. The spring washers 172 and 174 can be referred to as an example of a second resilient member. The snap ring 86.11 acts as a backstop, and the outer shim 170 and spring washers 172 and 174, respectively, press the second play reducing member 70.11 towards the bearing 62.11.

Figure 12:
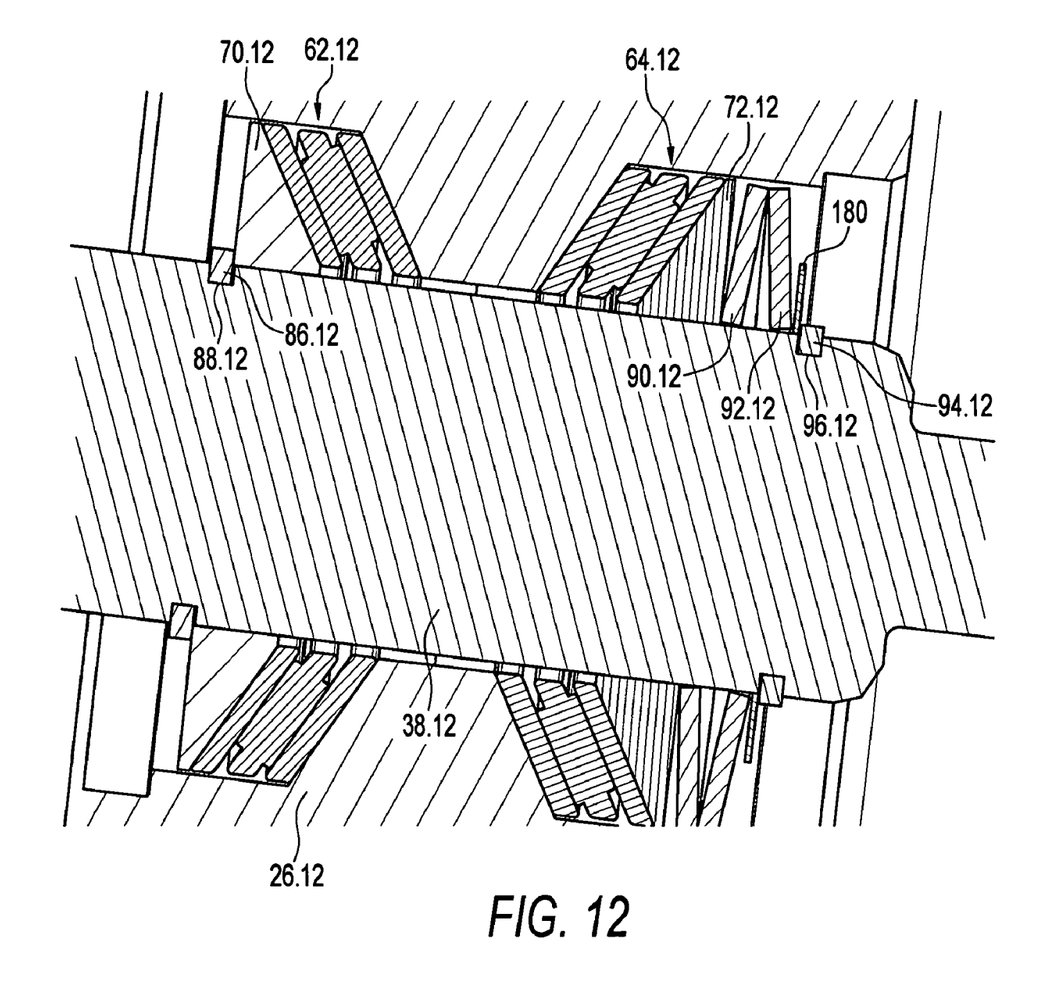
FIG. 12 is a view similar to FIG. 11 of an alternative embodiment of the invention where spring washers are located between the first play reducing member and inner shim, pressing the first play reducing member towards the bearing.

FIG. 12 shows a variation where like parts have like numbers with the additional designation ".12". This example is similar to FIG. 11, except spring washers 90.12 and 92.12 are located between the first play reducing member 72.12 and inner shim 180.

Figure 13:
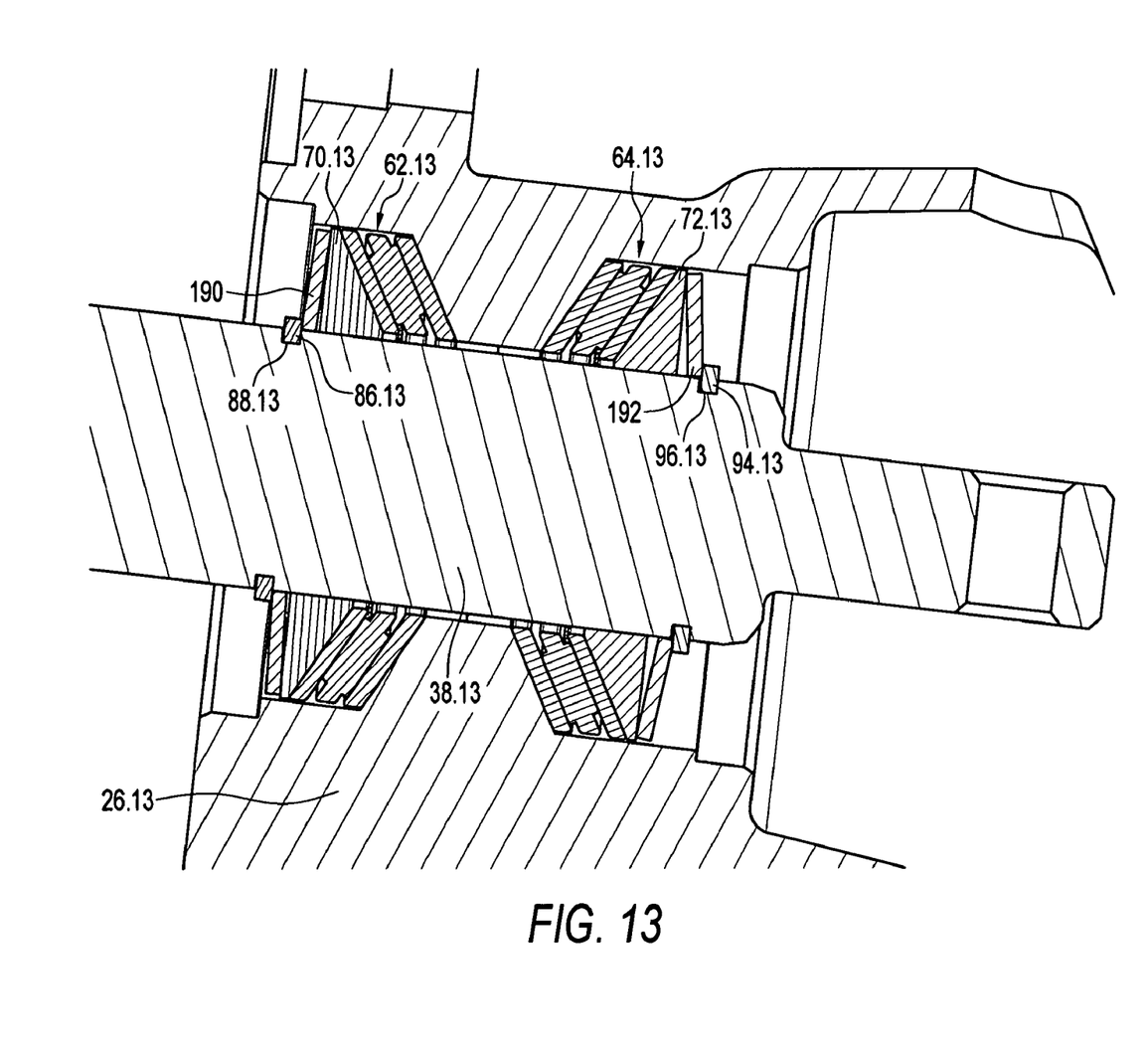
FIG. 13 is an enlarged sectional view of an alternative embodiment of the invention where a spring washer is located between the first play reducing member and adjacent snap ring, and another spring washer is located between the second play reducing member and adjacent snap ring.

FIG. 13 shows a variation where like parts have like numbers with the additional designation ".13". This embodiment has a spring washer 192 between the first play reducing member 72.13 and the snap ring 94.13, and a second spring washer 190 between the second play reducing member 70.13 and the snap ring 86.13. A further variation on this embodiment, though not shown, includes a pair of spring washers between each of the said play reducing members and said snap rings. Additionally, a further variation on this embodiment, though not shown, incorporates the outer shim as in FIG. 11, the inner shim as in FIG. 12, or a combination of outer and inner shims.

Figure 14:
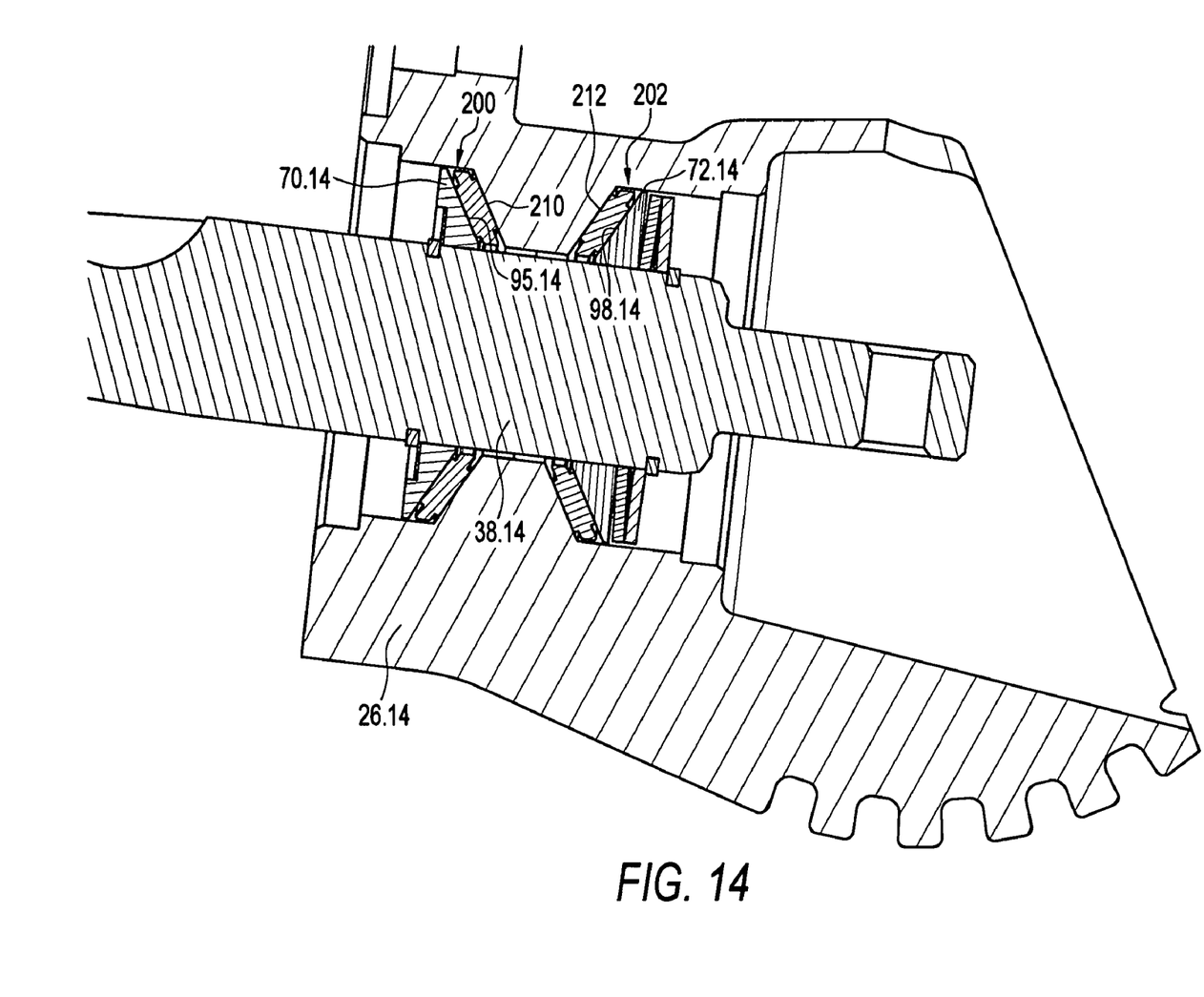
FIG. 14 is a view similar to FIG. 1 of an alternative embodiment of the invention where the housing and play reducing members act as races for the bearing rollers.

Another variation on the invention is shown in FIG. 14 where like parts have like numbers with the additional designation ".14". In this example, bearing races per se are not used nor needed. Bearing rollers 200 and 202 are enclosed between the housing 26.14 and play reducing members 70.14 and 72.14. It will be appreciated by those skilled in the art that the bearing rollers could be balls. Play reducing members 70.14 and 72.14 have inclined surfaces 95.14 and 98.14, respectively, which are shaped to function as first bearing races. These eliminate the need for first bearing races as exemplified by first bearing race 67 of previous embodiments of the invention. Similarly, the housing 26.14 has inclined surfaces 210 and 212, respectively, which are shaped to function as second bearing races. These eliminate the need for second bearing races as exemplified by second bearing race 69 of previous embodiments of the invention.

This embodiment provides the advantage of an even further reduction in play as felt in the steering shaft by reducing the number of contacting parts between the stub shaft, the play reducing members, the rollers, and the housing. This reduction in contacting parts results in a reduction in the amount of compounding of machine error, and hence play.

It will be understood by someone skilled in the art that many of the details provided above are by way of example only and are not intended to limit the scope of the invention which is to be determined with reference to the following claims.

What is claimed is:

1. A steering apparatus for a vehicle, comprising:
a housing;
a steering shaft having a longitudinal axis;
a first tapered needle bearing interposed between the steering shaft and the housing, permitting rotation of the steering shaft about the axis;
a first wedge-shaped member for wedging against the first tapered needle bearing, the first wedge-shaped member being annular and split; and
a means for biasing the first wedge-shaped member against the first tapered needle bearing to take up play between the steering shaft and first tapered needle bearing, and play within the first tapered needle bearing.

2. The steering apparatus of claim 1, wherein said means for biasing the first wedge-shaped member includes at least one snap ring extending about the steering shaft on a side of the first wedge-shaped member opposite the first tapered needle bearing.

3. The steering apparatus of claim 2, wherein the means for biasing the first wedge-shaped member includes a first resilient member extending about the steering shaft on the side of the first wedge-shaped member opposite the first tapered needle bearing.

4. The steering apparatus of claim 3, wherein the first resilient member is a spring.

5. The steering apparatus of claim 3, including a second tapered needle bearing spaced-apart along the steering shaft from the first tapered needle bearing and a second wedge-shaped member for wedging against the second tapered needle bearing.

6. The steering apparatus of claim 5, wherein an outer shim extends about the steering shaft on a side of the second wedge-shaped member opposite the second tapered needle bearing, said outer shim pressing the second wedge-shaped member towards the second tapered needle bearing.

7. The steering apparatus of claim 6, including a first stop on a side of the second member opposite the second tapered needle bearing which prevents movement of the second member away from the second tapered needle bearing.

8. The steering apparatus of claim 7, including a second stop on a side of the spring opposite the first wedge which prevents movement of the spring away from the first member.

9. The steering apparatus of claim 5, further having a shaft support area extending generally one inch along the steering shaft.

10. The steering apparatus of claim 1, wherein a bracket pivotally connects to the housing to provide a tilt steering apparatus, said bracket having means for mounting on the vehicle, and the steering shaft having a tiltable portion rotatably mounted on the housing.

11. The steering apparatus of claim 1, wherein the housing has a cavity, the steering shaft being received within the cavity, the cavity including an enlarged portion, the first tapered needle bearing being disposed within the enlarged portion.

12. The steering apparatus as claimed in claim 11, wherein the housing includes an angled interior surface adjacent to the enlarged portion of the cavity, the angled interior surface of the housing extending towards the steering shaft, the first tapered needle bearing abutting with the housing at the angled interior surface.

13. A steering apparatus for a vehicle, comprising:
a support member having a cavity therein; a steering shaft received within the cavity, the steering shaft having a longitudinal axis;
a pair of tapered needle bearings interposed between the shaft and the member, permitting rotation of the steering shaft about the axis; and
a pair of play reducing members, each said play reducing member being a split ring extending about the steering shaft, being wedge-shaped in section and having a surface tightly engaging one of said tapered needle bearings, the surface of each said play reducing member being inclined with respect to the axis.

14. The steering apparatus of claim 13, wherein the cavity of the support member includes a pair of enlarged portions, the support member includes a pair of angled interior surfaces adjacent to the pair of enlarged portions, respectively, the pair of angled interior surfaces extending towards the steering shaft, and the pair of tapered needle bearings being disposed within the enlarged portions and abutting the support member at the pair of angled interior surfaces, respectively, of the support member.

15. A steering apparatus for a marine vehicle, comprising:
a housing having a cavity, the cavity including a pair of enlarged portions, the housing including a pair of angled interior surfaces adjacent to the pair of enlarged portions, respectively;
a stub shaft disposed within the cavity of the housing, the stub shaft having a longitudinal axis, the pair of angled interior surfaces extending towards the stub shaft;
a first tapered needle bearing interposed between the stub shaft and the housing, permitting rotation of the stub shaft about the axis, the first tapered needle bearing being disposed within one of the pair of enlarged portions of the cavity of the housing and abutting the housing at one of the pair of angled interior surfaces of the housing;
a first play-reducing member, the first play-reducing member being a split ring extending about the stub shaft, being wedge-shaped in section and having a surface tightly engaging the first tapered needle bearing, said surface of the first play-reducing member being inclined with respect to the axis;
a means for biasing the first wedge-shaped member against the first tapered needle bearing to take up play between the stub shaft and the first tapered needle bearing, and play within the first tapered needle bearing, the means for biasing including a spring washer extending about the stub shaft on the side of the first wedge-shaped member opposite the first tapered needle bearing, and the means for biasing further including a snap ring extending about the stub shaft on a side of the first wedge-shaped member opposite the first tapered needle bearing;
a second tapered needle bearing spaced-apart along the stub shaft from the first tapered needle bearing, the second tapered needle bearing being interposed between the stub shaft and the housing, permitting rotation of the stub shaft about the axis, the second tapered needle bearing being disposed within another of the pair of enlarged portions of the cavity of the housing and abutting the housing at another of the pair of angled interior surfaces of the housing;
a second play-reducing member, the second play-reducing member being a split ring extending about the stub shaft, being wedge-shaped in section and having a surface tightly engaging the second tapered needle bearing, said surface of the second play-reducing member being inclined with respect to the axis; and a first stop on a side of the second play-reducing member opposite the second tapered needle bearing which prevents movement of the second play-reducing member away from the second tapered needle bearing.

16. The steering apparatus of claim 15 wherein the first play-reducing member is sandwiched between the first tapered needle bearing and the stub shaft, the second play-reducing member is sandwiched between the second tapered needle bearing and the stub shaft, and the second play-reducing member is spaced-apart from the first play-reducing member so as to provide a shaft support area extending generally one inch along the stub shaft.

17. The steering apparatus of claim 15 wherein a bracket pivotally connects to the housing to provide a tilt steering apparatus, said bracket having means for mounting on the marine vehicle, and the stub shaft having a tiltable portion rotatably mounted on the housing.

18. The steering apparatus of claim 3, wherein the first resilient member is a washer.

* * * * *